(12) United States Patent
Maxwell (10) Patent No.: US 6,717,282 B1
(45) Date of Patent: Apr. 6, 2004

(54) COMBINED MOTOR AND GENERATOR DYNAMOMETER SYSTEM

(76) Inventor: William J. Maxwell, 1017 Five Forks, Virginia Beach, VA (US) 23455

( * ) Notice: Subject to any disclaimer, the term of this patent is extended or adjusted under 35 U.S.C. 154(b) by 0 days.

(21) Appl. No.: 10/190,126

(22) Filed: Jul. 3, 2002

(51) Int. Cl.[7] ................................................ F02N 11/00
(52) U.S. Cl. ................ 290/40 R; 290/40 B; 324/76.41; 322/7
(58) Field of Search ........................... 290/40 R, 40 A; 322/7; 324/76.41

(56) References Cited

U.S. PATENT DOCUMENTS

| | | | |
|---|---|---|---|
| 4,125,894 A | * 11/1978 | Cashel et al. ................. 701/123 |
| 4,338,788 A | 7/1982 | Fink ............................ 60/648 |
| 4,394,582 A | 7/1983 | Kreissl et al. ................... 290/4 |
| 4,506,631 A | 3/1985 | Phong-Anant ................... 122/2 |
| 4,677,307 A | 6/1987 | Vadas et al. ..................... 290/2 |
| 4,715,192 A | 12/1987 | Katz ......................... 62/323.1 |
| 4,752,697 A | 6/1988 | Lyons et al. ..................... 290/2 |
| 5,077,516 A | * 12/1991 | Meyer ............................ 322/7 |
| 5,391,925 A | 2/1995 | Casten et al. .................... 290/1 |
| 5,536,976 A | 7/1996 | Churchill ...................... 307/11 |
| 5,625,276 A | * 4/1997 | Scott et al. ................... 322/214 |
| 5,700,427 A | * 12/1997 | Ghaed et al. .................. 422/52 |
| 6,219,623 B1 | * 4/2001 | Wills ............................ 702/60 |
| 6,373,144 B2 | * 4/2002 | Frohlich et al. ............ 290/40 R |
| 6,410,992 B1 | * 6/2002 | Wall et al. ...................... 290/52 |
| 2001/0002090 A1 | * 5/2001 | Frohlich et al. ............ 290/40 R |
| 2001/0054890 A1 | * 12/2001 | Thibedeau et al. ........ 324/76.41 |

\* cited by examiner

*Primary Examiner*—Nicholas Ponomarenko
(74) *Attorney, Agent, or Firm*—Price & Adams (57) ABSTRACT

A turboshaft or shafted engine, as used in helicopter, aircraft, locomotive, marine engines, and the like, is tested in accordance with a routine maintenance schedule. The turboshaft is drivingly connected to a motor/generator set that also performs the operation of a dynamometer in load testing the turboshaft. The generator operates as a motor to start the turboshaft engine and conduct the diagnostic testing. The output from the turboshaft under test is used as a source of electrical power as a by-product of the diagnostic testing. The mechanical energy produced by the turboshaft is transferred by a power transfer mechanism to the generator. The generator converts the mechanical energy to electricity. As a dynamometer, the generator measures the electricity produced to obtain a measure of the output power of the engine under test. The electricity produced by the generator is then conditioned to be compatible for transmission to an electrical power system that supplies the electricity to a local power grid for consumption or resale. With this arrangement, the electrical power resulting from the diagnostic testing of the turboshaft engine is available for use to reduce the cost of electrical consumption and demand cost by load shedding during periods of peak power demand.

20 Claims, 10 Drawing Sheets

Fig. 14

COMBINED MOTOR AND GENERATOR DYNAMOMETER SYSTEM

BACKGROUND OF THE INVENTION

1. Field of the Invention

This invention relates to method and apparatus for the diagnostic testing of engines, such as turboshaft engines, and, more particularly, to a motor/generator dynamometer system used to start an engine where mechanical energy produced by the engine is converted to electrical power for transmission to a local power grid for resale or consumption.

2. Description of the Prior Art

Engines operated by the armed forces generally utilize three levels of maintenance for their respective systems that include local level, intermediate level, and depot level. The support equipment determines the levels of maintenance that are provided. Generally, both intermediate and depot level maintenance require extensive load testing of all engines which are overhauled, repaired, and/or processed.

Conventionally turboshaft aircraft engines are tested on raised "stands" or test "platforms". Engine breaking during the test is produced using the gearbox and propeller of an aircraft dedicated exclusively to the "stand/test platform". This standard diagnostic test system allows an operator to complete the required test and evaluation which automatically produces a record for the engine's log. These tests, particularly within a test cell create an adverse working environment due to the propeller producing a fine oil mist during the testing procedure. The operators spend much of their time working on the gear box and propellers. Currently, tests for engine performance use propellers for testing turboshaft aircraft engines.

A standard diagnostic test system is also used for testing turboshaft helicopter engines. Overall, the tests differ in the manner employed to load test the specific engines. In one application, the turboshaft helicopter engines are load tested with air dynamometers. Within a test cell an air dynamometer requires an air inlet and an outlet for the large volume of air used for the breaking action. Consequently, the test cell complexity is increased with the air inlet and exhaust outlet for both the turboshaft engine tested and the air dynamometer.

A known device for utilizing waste products to power a generator which provides electricity for a plant or for export is disclosed in U.S. Pat. No. 4,506,631. Municipal waste products are incinerated to release energy which is recovered to drive a steam or gas turbine. The turbine then drives a generator which changes the power into electricity. The electricity can be used by the plant or can be sold when demand is low.

U.S. Pat. Nos. 4,677,307; 4,394,582; and 4,715,192 disclose cogeneration systems which utilize exhaust heat to power turbines and electrical generators. The corresponding electricity can then be used to meet the changing demands of the facility or the very engine which powers the generator. U.S. Pat. No. 4,715,192 further discloses the ability to sell excess power to a local utility.

U.S. Pat. No. 4,752,697 discloses a cogeneration system which utilizes a heat engine to drive an electrical generator. The generator is coupled to the utility lines and provides supplemental power when necessary. In addition, supervisory means is provided for monitoring the electrical energy and/or power supplied by the generator, supplied by the utility, and consumed by the site.

U.S. Pat. No. 5,536,976 discloses a cogeneration system which adjusts to meet different heat and electrical demands of residential and small commercial sites. Excess power is sold to the utility upon generation. Means are provided for the synchronizing and paralleling necessary to operate the co-generator in parallel with the utility.

U.S. Pat. No. 4,338,788 discloses a cogeneration system in which a steam turbine of a power plant generator is directly linked to a stream of pressurized air from the fluidized catalytic cracking unit of a petroleum refinery.

U.S. Pat. No. 5,391,925 discloses a method for driving a large cooling system having a chiller compressor driven by a prime mover, such as a gas turbine. A reciprocating engine or a steam turbine in conjunction with an electric motor/generator is coaxially arranged on a common shaft. As the ambient temperature rises, the power demand of the compressor increases while the efficiency of the gas or steam turbine decreases. To compensate for the drop in power supply, additional driving power is supplied by the electric motor. Conversely, as the ambient temperature drops the compressor requires less power and the turbine's efficiency increases. At this point, the turbine provides excess power to the compressor. The electric motor then operates as a generator and converts the excess power from the turbine into electricity which can then be used for internal use or can be sold to the local power grid.

The cost of commercial electrical utility usage is generally determined by a number of factors such as: (1) usage or consumption of electrical power, (2) load shedding by turning off electrical equipment during periods of peak demand for electrical power, and (3) peak shaving by producing on site electrical power during periods of peak demand. Generally, it is not economical for a utility to run large expensive, but efficient, power plants for short durations to meet peak demand. Peak demands are met by contract power, intercompany pool power, small generating plants such as hydroelectrical, turbo-generation, turbo-generation plus co-generation, diesel generation and the like. The smaller generating plants are not as efficient as the large generating plants, but they are quick to start and are far less expensive to capitalize.

Therefore, there is need for a motor/generator dynamometer system that provides diagnostic testing of turboshaft engines and serves as a source of electrical power supply. Once the engine is started, the motor/generator system would be switched to the generation of electrical power. The current and voltage of the generated electrical power would then be synchronized to that of a municipal or commercial power grid for consumption or resale.

A problem to be resolved in producing electrical power from turboshaft engine testing is scheduling the engine test during periods of peak demand to achieve peak shaving benefits. It would be unwise to subordinate an engine test program to attain the financial rewards for peak shaving as a utility function. On the other hand, with a sufficient engine test program, prudent management could easily attain the economics of peak shaving.

Producing electrical power from power shaft engine testing would serve to reduce the cost of electrical consumption and demand cost by load shedding. Savings would then be realized by increased manpower efficiency, reducing the activity/station local power company annual demand charge, generating credit or revenues by selling of electric current produced by the motor/generator dynamometer system, reducing maintenance and operating costs over old testing systems, and reducing the size of the test cell facility. In concert, these systems can provide emergency generation immediately for local or grid requirements.

SUMMARY OF THE INVENTION

In accordance with the present invention there is provided a method for supplying electricity to an electrical power system that includes the steps of starting an engine under test. Mechanical energy is generated from a test conducted on the engine. The mechanical energy produced by the engine under test is transferred through a power transfer mechanism to a generator. The mechanical energy is converted into electricity by the generator. The electricity produced by the generator is measured to obtain a load for establishing the power of the engine being tested. The electricity produced during testing of the engine is supplied to an electrical power system for consumption.

Further, in accordance with the present invention there is provided apparatus for converting mechanical energy produced during testing of an engine to electricity that includes an engine under test. A generator is coupled to the engine. A mechanism is provided for transferring the mechanical energy produced by the engine during testing to the generator for conversion to electricity. The electricity produced by the generator is measured to obtain a load for evaluating the power produced by the engine under test. A power conditioner connects the generator to an electrical power system to adjust the electricity produced by the generator during testing of the engine for supply to the electrical power system.

In addition, the present invention is directed to a method for converting mechanical energy produced during the testing of an engine to electricity for power consumption that includes the steps of starting an engine under test. Mechanical energy and exhaust are generated from testing the engine. The mechanical energy generated from testing the engine is transferred to a generator. The mechanical energy is converted by the generator to electricity. The electricity produced by the generator is conditioned for transmission to an electrical system for power consumption. The engine exhaust is fed to a steam boiler for generation of steam. The steam produced by the steam boiler is fed to a steam turbine. Mechanical energy is generated from the steam fed to the steam turbine. The mechanical energy produced by the steam turbine is transferred to a generator. The mechanical energy is converted by the generator to electricity. The electricity produced by generator is conditioned for consumption by an electrical power system. The conditioned electricity generated from testing the engine is supplied to the electrical power system.

Accordingly, a principal object of the present invention is to provide a motor/generator system for testing engines where the mechanical energy generated from the engine test is converted at a test stand by a motor/generator to electricity which is conditioned for transmission to an electrical power system for consumption.

Another object of the present invention is to provide a method for transferring electrical power generated during the testing and maintenance of a turboshaft engine to an electrical power grid to reduce the cost of electrical consumption.

A further object of the present invention is to provide method and apparatus for testing the performance of turboshaft engines, such as aircraft engines, in the maintenance and repair of the engines and convert the energy generated from the engine testing to electrical power to supplement the electrical power supplied by an electrical utility company during periods of peak power demand.

An additional object of the present invention is to provide a turboshaft engine testing system that utilizes a generator for converting mechanical energy produced by an engine under test to electrical power which is supplied to a local power grid for resale and/or consumption where the generator is also operable as a motor to start the engine under test and a dynamometer for measuring the mechanical energy generated by the engine during testing.

Another object of the present invention is to provide apparatus for testing the performance of an engine by converting the mechanical energy generated by a turboshaft of the engine to electrical power for transmission to a power grid of a municipal power supply for usage during periods of peak power demand to achieve peak shaving benefits to the power supply system and when necessary provide emergency power "on site" or to the grid.

These and other objects of the present invention will be more completely disclosed and described in the following specification, the accompanying drawings, and the appended claims.

DESCRIPTION OF THE PREFERRED EMBODIMENTS

Figure 1:
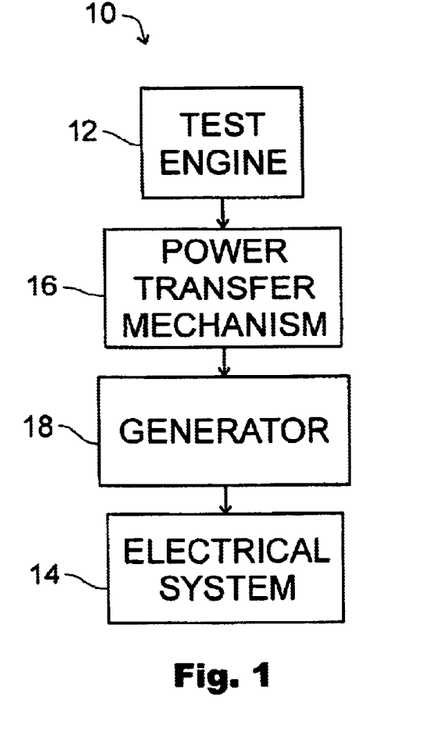
FIG. 1 is a diagrammatic illustration of a system for converting energy generated from an engine test to electricity for consumption in an electrical power system.
Figure 2:
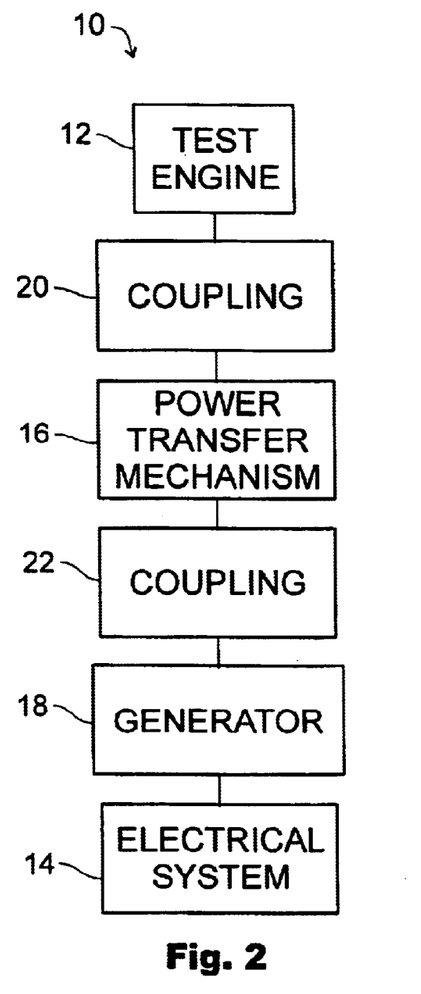
FIG. 2 is a diagrammatic illustration similar to FIG. 1, illustrating a further embodiment for converting mechanical energy from an engine under test to electricity for power consumption.

Referring to the drawings and, particularly to FIGS. 1 and 2, there is diagrammatically illustrated a system generally designated by the numeral 10 for recovering excess energy from test engines. The system 10 converts energy that is produced during testing of an engine 12 into electricity for use in an electrical power system 14. A power transfer mechanism 16 receives the energy from the test engine 12, and a generator 18 converts the energy into electricity.

The test engine 12 is positioned to transfer energy to a power transfer mechanism 16. Accordingly, the power transfer mechanism 16 must also be positioned to receive energy from the test engine 12. The test engine 12 is connected by a coupling 20 to the power transfer mechanism 16. As shown in FIG. 2, the test engine 12 is connected by a coupling 20 to the power transfer mechanism 16. The mechanical energy produced by the test engine 12 is transferred by the physical connection of coupling 20 to the power transfer mechanism 16.

The power transfer mechanism 16 is positioned to transfer energy to the generator 18. Energy is transferred through any suitable means, such as a direct physical connection in the form of coupling 22 or through fluid transport.

In one embodiment, the electrical system 14 is a local electrical system that powers the immediate area around the system 10. Alternatively, the electrical system 14 is a municipal power grid that services a greater portion of the surrounding area. The electrical system 14 can also be a conduit to a suitable electrical storage device (not shown).

In operation, the test engine 12, as diagrammatically illustrated in FIGS. 1 and 2, is started as part of a test routine. The test engine 12 must be tested to measure certain specified performance characteristics. The test routine is monitored and modified to simulate the typical demands imposed upon the test engine during performance. The test engine 12 is a selected one of a new engine, a repaired engine, a reworked engine, or a rebuilt engine. The test engine 12 is powered by a suitable fuel, such as gasoline or diesel fuel. The test engine 12 can also be an electric motor. The test engine can be taken from an aircraft, helicopter, truck, tank, or any mechanism that utilizes a turboshaft engine. The test engine 12 can also be an engine that was designed for other purposes.

The energy generated by the test engine 12 is transferred through the power transfer mechanism 16 to the generator 18. The primary function of the generator 18 is to convert mechanical energy into electricity. The secondary function of the generator 16 is operation as a dynamometer. The generator 18, as a dynamometer, measures the amount of electricity produced by the generator 18 and determines the load produced by the test engine 12 from the measurement of the electricity. The measurement of electricity allows for modification of the test routine, as necessary.

Figure 3:
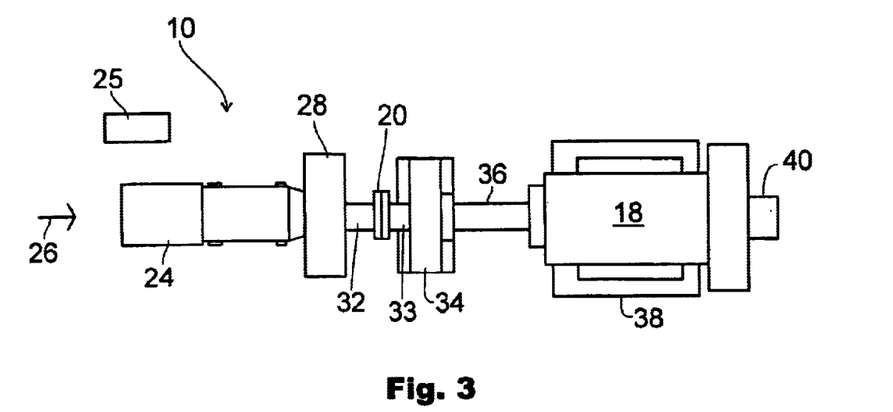
FIG. 3 is a top plan schematic view of a test cell for converting mechanical energy generated during the test of a gas turbine to electricity for transmission to an electrical power distribution system.
Figure 4:
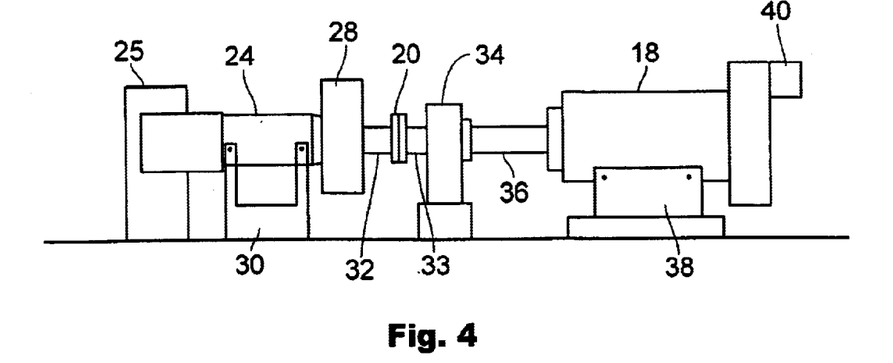
FIG. 4 is a schematic view in side elevation of the test cell shown in FIG. 3.

As illustrated in FIGS. 3 and 4, the system 10 is controlled from an instrument panel 25. A gas turbine 24 is mounted on test bed 30 and includes exhaust outlet 28. The gas turbine 24 connects to a shaft 32. The shaft 32 connects through coupling 20 to a second shaft 33. The second shaft 33 connects to gears 34, which are mounted in a gear assembly. The gears 34 are drivingly connected to a third shaft 36. The shaft 36 is drivingly connected to the generator 18, which is positioned on mount 38. The generator 18 is electrically connected to the electrical power system 14, described above in FIGS. 1 and 2, through power leads 40.

Figure 5:
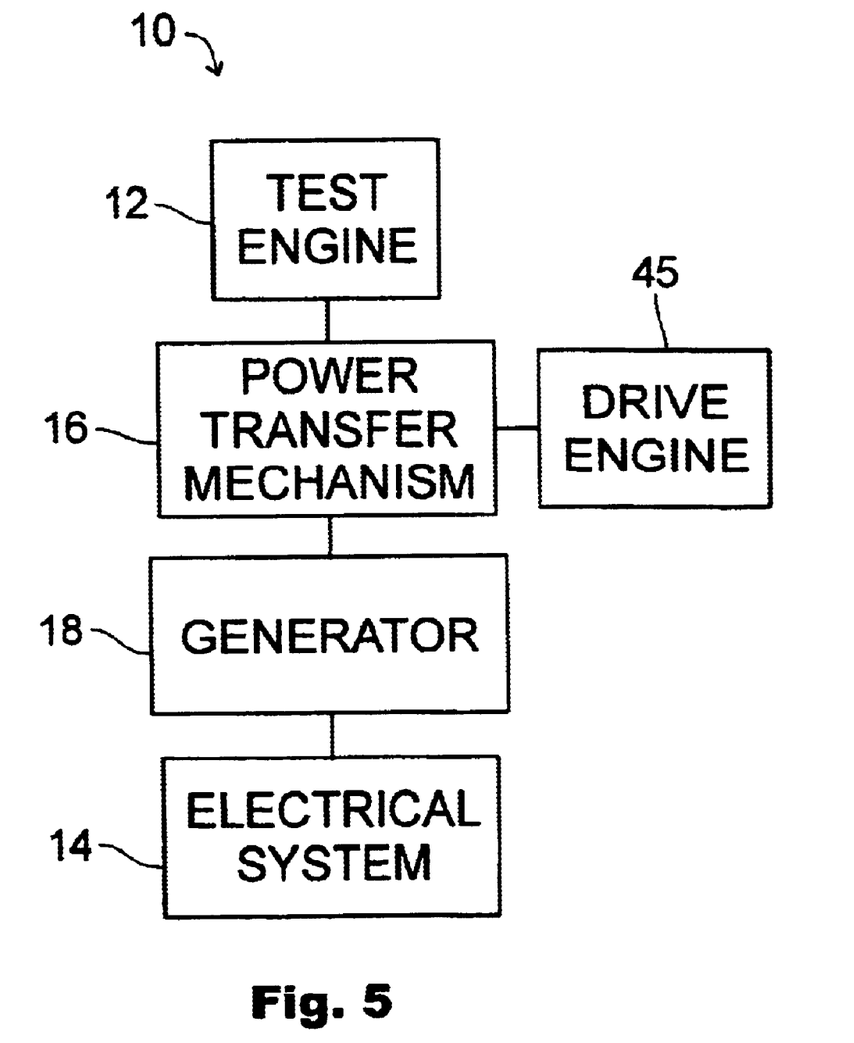
FIG. 5 is a diagrammatic illustration of a system for recovering energy generated from a test engine similar to FIG. 1, illustrating a second engine under test for transmitting mechanical energy to the generator for conversion to electricity.
Figure 6:
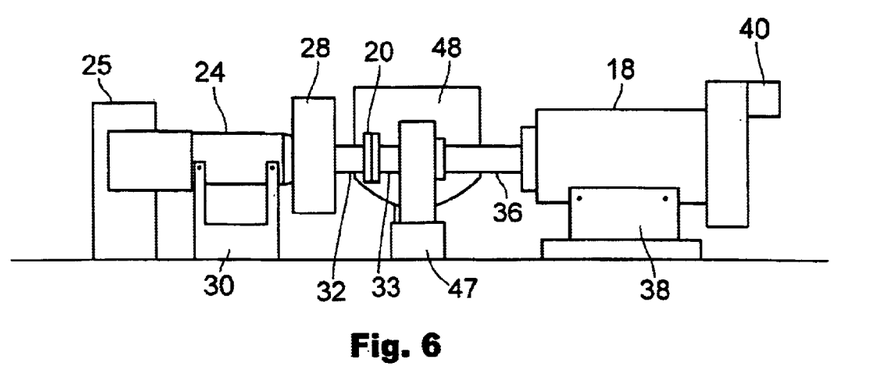
FIG. 6 is a schematic view in side elevation of a further embodiment of the test cell of the present invention, illustrating the connection of a gas turbine to the generator to supplement the supply of electricity during periods of peak demand.
Figure 7:
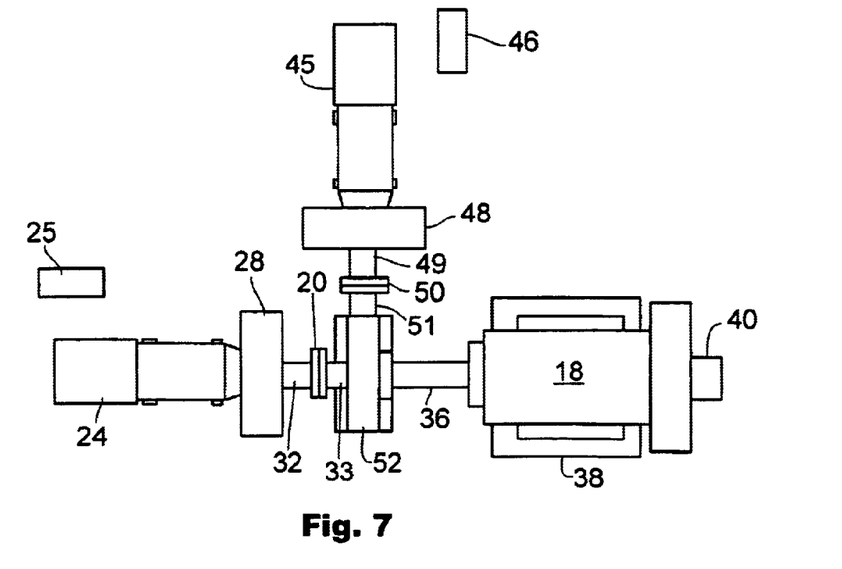
FIG. 7 is a top plan schematic view of the test cell shown in FIG. 6.

Now referring to FIGS. 5–7, there is illustrated a test engine 12 and drive engine 45 attached to the system 10. In FIG. 7, the drive engine 45 is a gas turbine, which is controlled from instrument panel 46 on a turbine bed 47. The gas turbine 45 includes an exhaust outlet 48 and shaft 49 drivingly connected by coupling 50 and shaft 51 to a gear assembly 52. With this arrangement, mechanical energy produced by gas turbine 45 is transferred through the gear assembly 52 to the motor/generator 18. This power transfer supplements the transfer of mechanical energy produced by gas turbine 24 under test through shaft 32, coupling 20, and shaft 33 to the gear assembly 52. With this arrangement, multiple engines are utilized to generate electricity as a by-product of turboshaft testing routines independently or in conjunction each with the other for optimal energy output.

Figure 8:
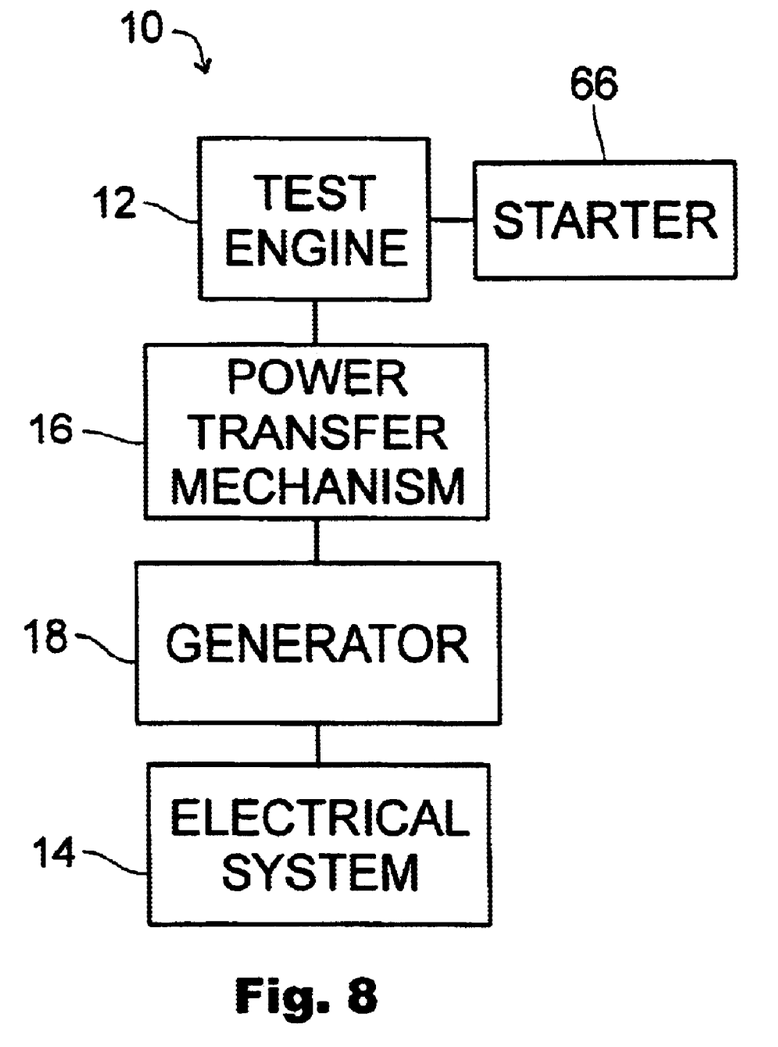
FIG. 8 is a diagrammatic illustration of the present invention similar to FIG. 1, illustrating the provision of a starter engine for starting the engine under test.

Now referring to FIG. 8, there is illustrated an additional embodiment of the system 10 that includes an engine starter 66 for starting the test engine 12. The engine starter 66 is coupled to the test engine 12 or is directly connected to the test engine 12.

Unlike the embodiments shown in FIGS. 1–7, the embodiment of the invention shown in FIG. 8 includes an engine starter 66 as an additional component to the system 10. Operation of the engine starter 66 is independent of or integral with testing of the turboshaft engine 12. Embodiments of engine starter 66 may alternately include batteries, solid propellants, hydraulic power, air start systems, and other similar devices.

In the embodiment of the present invention illustrated in FIG. 8 of the engine under test, the generator 18 performs the function of a motor for starting the test engine 12.

Figure 9:
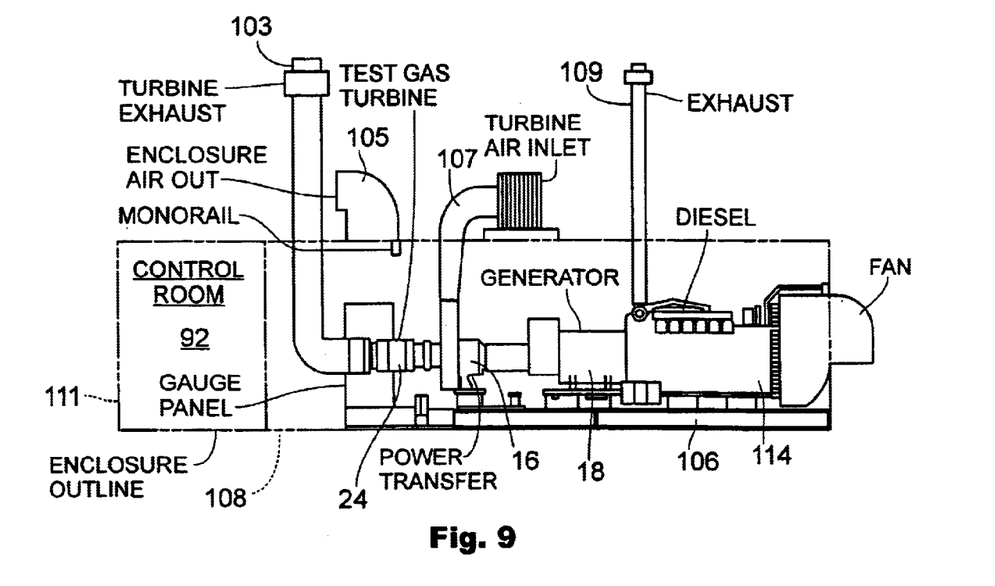
FIG. 9 is a schematic view in side elevation of another embodiment of the present invention for enclosing a test engine that provides electrical power to a power grid as a by-product of the engine test.
Figure 10:
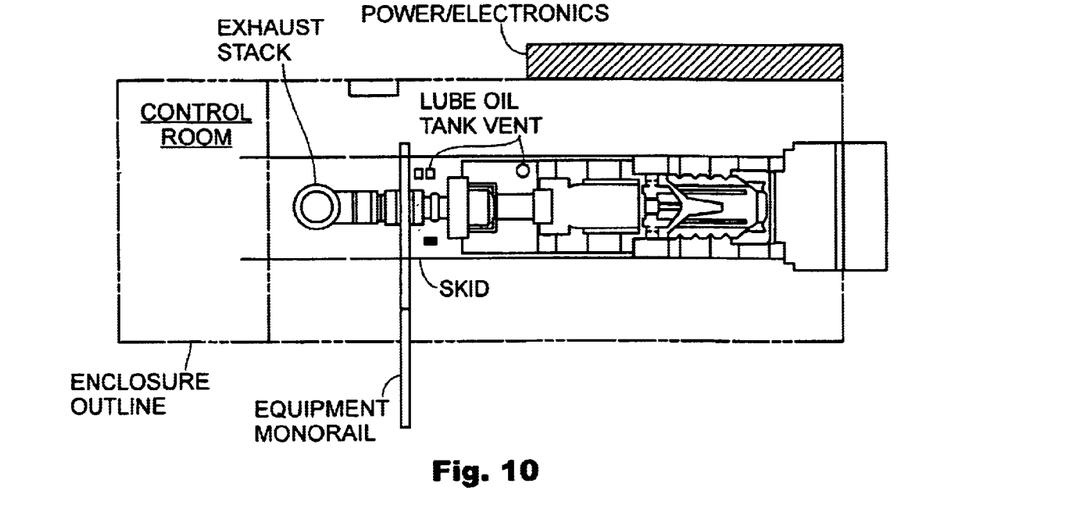
FIG. 10 is a top plan schematic view of the enclosed test engine, shown in FIG. 9.

Now referring to FIGS. 9 and 10, there is illustrated a further embodiment of the system 10 that includes a movable skid 106 for supporting a portable enclosure 108 in which gas turbine engine 24 is tested. The power transfer mechanism 16, the generator 18, and a means for receiving energy from the test engine 24 are mounted on the movable skid 106. The movable skid 106 is movably supported by wheels or other suitable means for movably supporting the skid 106. The enclosure 108 includes suitable ventilation ducts. Exhaust from the engine 24 is conveyed through exhaust duct 103. Air in the enclosure is conveyed from duct 105. Inlet air to turbine 24 is conveyed through duct 107. Exhaust produced by the diesel powered generator is conveyed from duct 109.

The portable enclosure 108 surrounds the test turbine engine 24, power transfer mechanism 16, and generator 18 and drive engine 114. The enclosure 108 is mounted on the skid 106 and includes a control room 111. Enclosing the test engine 24 and drive engine 114 and supporting the enclosure 108 on the movable skid 106 allows for outdoor testing of the engine 24.

Figure 11:
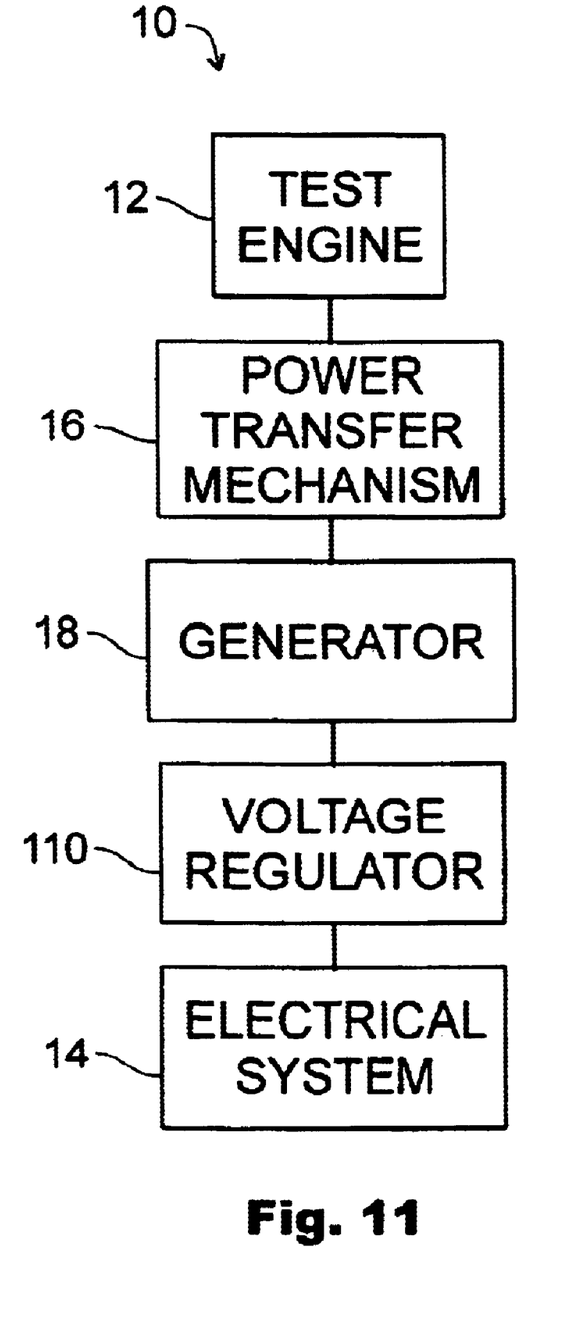
FIG. 11 is a diagrammatic illustration of another embodiment of the present invention for recovering electrical energy generated during the testing of an engine, illustrating the addition of a voltage regulator for synchronizing the current and voltage of the electricity produced by the generator.

In the embodiment of the present invention diagrammatically shown in FIG. 11, the system 10 includes a voltage regulator 110 for synchronizing the current and voltage of the electrical energy produced by the generator 18 to the current and voltage of the local power grid. The voltage regulator 110 is coupled to the generator 18 and to the electrical system 14 that transmits the electricity produced by the generator 18 during testing of the engine 12 to the local power grid.

Figure 12:
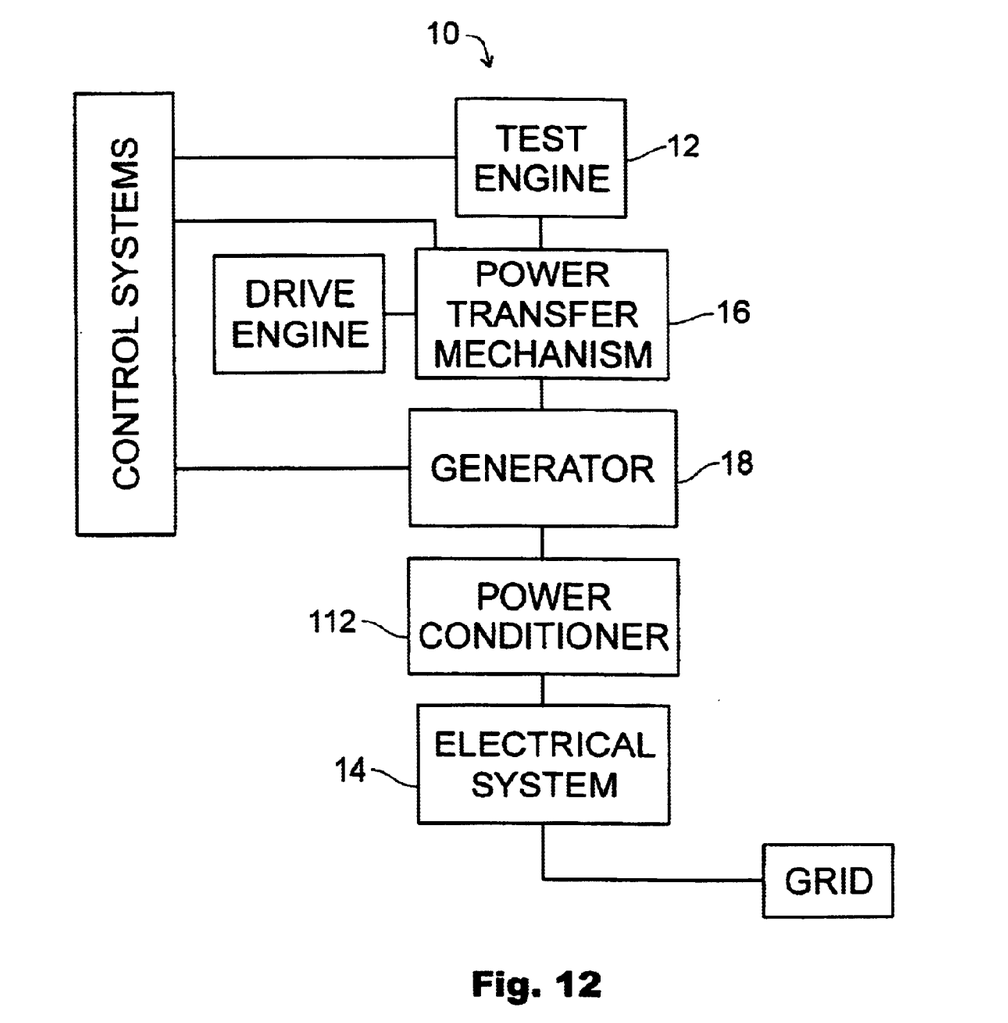
FIG. 12 is a further diagrammatic illustration of the present invention similar to FIG. 11, illustrating a power conditioner for regulating the electricity produced by the generator for compatibility with an electrical power system.

In the embodiment shown in FIG. 12, the system 10 includes a power conditioner 112. The power conditioner 112 receives electricity from the generator 18. The power conditioner 112 conditions the electricity before the electricity is transferred by the electrical power system 14 to the power grid. The power conditioner 112 enables the system 10 to compensate for the need to test the test engine 12 for a range of manufacturer recommended speeds. The provision of a power conditioner 112 insures that the electricity supplied to the electrical system 14 and transferred to the power grid is of sufficient quality and performance to conform to the requirements of the electrical system 14.

Figure 13:
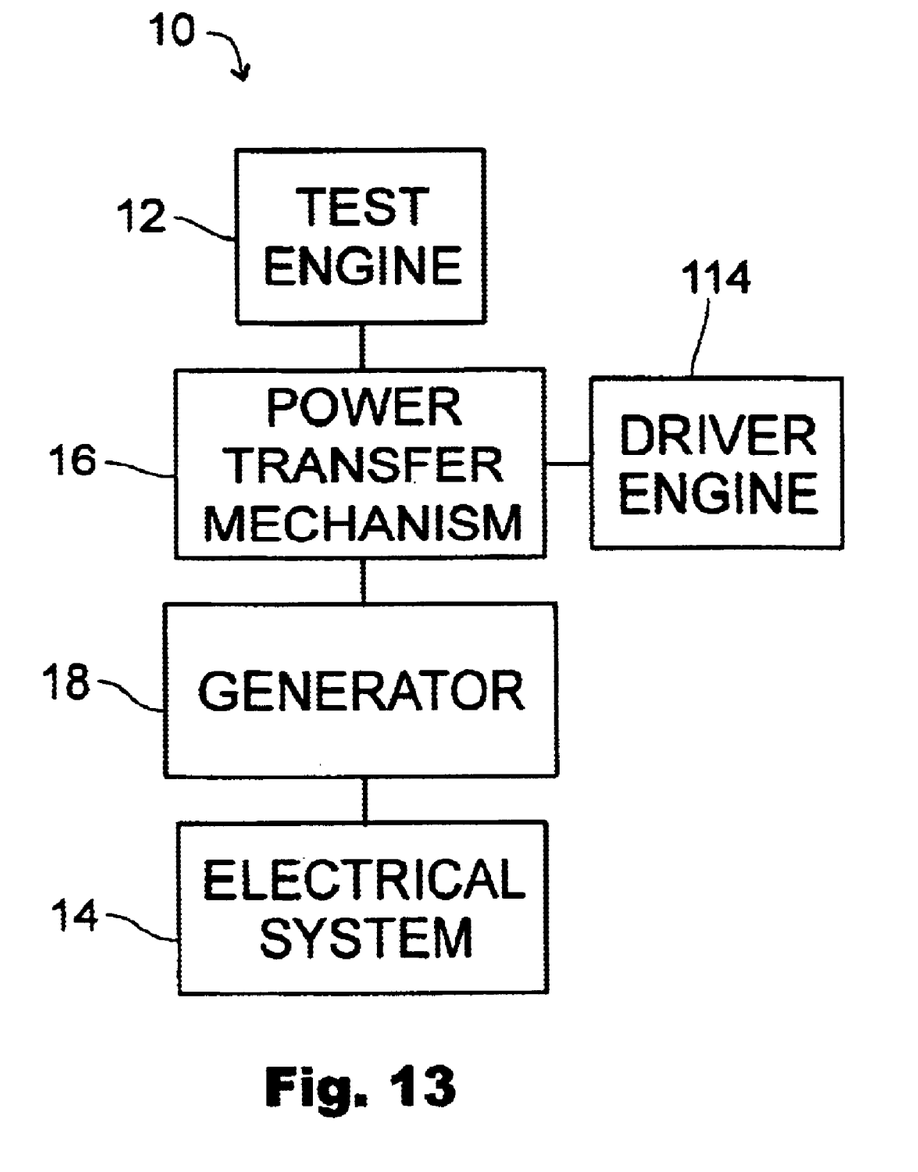
FIG. 13 is a diagrammatic illustration of another embodiment of the present invention, illustrating a driver engine for supplying mechanical energy to the generator in lieu of intermittent operation of the test engine.

In the embodiment shown in FIG. 13, a driver engine 114 is used to produce mechanical energy for conversion to electricity by the generator 18. The driver engine 114 produces an equal or greater amount of energy than the test engine 12. The electricity produced by the generator 18 from the conversion of mechanical energy produced by the driver engine 114 results in a larger load. As a result, the additional energy produced by the test engine 12, as dictated by the requirements of the test routine, can be supplemented.

With the present invention, the benefits of a driver engine 114 can be realized by taking advantage of the favorable economics of "peak shaving". The term "peak shaving" refers to the practice of producing on-site electrical power during periods of peak demand. By supplying electricity to the on-site electrical power system 10, the benefits of peak shaving can be achieved.

The driver engine 114 is not restricted by the demands of the test routine and produces energy, as needed, to supplement the test engine 12 during periods of peak demand. The periods of peak demand for the on-site electrical system 14 may not correspond to the periods of peak production of energy for the test engine 12, which must be restricted to the required limits of the test routine.

Figure 14:
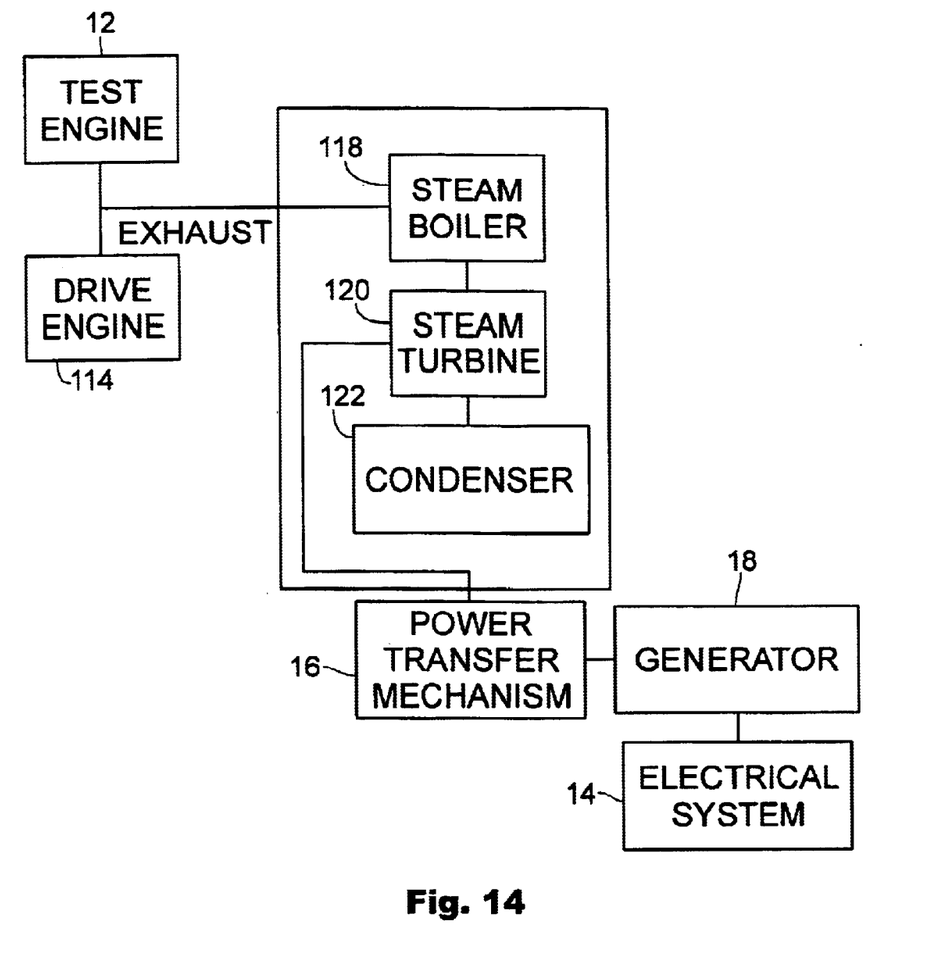
FIG. 14 is a diagrammatic illustration of an embodiment of the present invention for conveying the exhaust generated from operation of the test engine and/or the drive engine to a steam boiler for generating steam to produce mechanical energy to power a generator for supplying electricity to an electrical power system.

FIG. 14 illustrates an embodiment of the present invention for producing electricity through co-generation. Co-generation involves the conversion of heat, preferably waste heat, into electricity. As is shown in FIG. 14, the heat is generated from the exhaust produced by the test engine 12 and the driver engine 114. The heat from the exhaust is transferred to a heat recovery unit generally designated by the numeral 116 for conversion to mechanical energy.

The heat recovery unit 116 includes a steam boiler 118, a steam turbine 120, and a condenser 122. The exhaust generated by the test engine 12 and/or the drive engine 114 is fed to the steam boiler 118. The steam boiler 118 converts the heat from the exhaust to steam. The steam is conveyed to the steam turbine 120 for the production of mechanical energy. The mechanical energy is transmitted by the power transfer mechanism 16 to the generator 18. The condenser 122 is positioned to receive the steam from the steam turbine 120.

In operation, the test engine 12 and the driver engine 114 produce exhaust, which is combined and fed to the steam boiler 118. Heat from the exhaust causes water to boil in the steam boiler 118, forming steam. The steam is fed to the steam turbine 120, which converts the energy from the steam into mechanical energy. The mechanical energy produced by the steam turbine 120 is transferred by the mechanism 16 to the generator 18. The generator 18 converts the mechanical energy to electricity which is fed to the electrical system 14 for distribution to a local power grid for consumption or resale.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for supplying electricity to an electrical power system comprising the steps of:

starting an engine under test, generating mechanical energy from a test conducted on the engine, transferring the mechanical energy produced by the engine under test through a power transfer mechanism to a generator, converting the mechanical energy into electricity by the generator, measuring the electricity produced by the generator to obtain a load for establishing the output power of the engine under test, and supplying the electricity produced during testing of the engine to an electrical power system for consumption.

2. A method as set forth in claim 1 which includes:

measuring the electricity produced by the generator to determine the quantity of mechanical energy produced by the engine under test.

3. A method as set forth in claim 2 which includes:

performing a test routine on the engine, and adjusting the test routine to alter the quantity of the mechanical energy produced by the engine under test.

4. A method as set forth in claim 1 which includes:

coupling the engine under test to the generator by a power transfer mechanism.

5. A method as set forth in claim 1 which includes:

connecting a starter engine to the engine under test to start the engine.

6. A method as set forth in claim 1 which includes:

operating the generator as a motor to start the engine under test.

7. A method as set forth in claim 6 which includes:

after starting the engine under test simultaneously operating the generator to produce electricity and as a dynamometer.

8. A method as set forth in claim 1 which includes:

conditioning the electricity produced by the generator for transmission to a power grid.

9. A method as set forth in claim 1 which includes:

connecting a drive engine to the generator to transfer mechanical energy to the generator, and co-sharing the transfer of mechanical energy by the engine under test and the drive engine to the generator for supply of electricity to the electrical power system.

10. A method as set forth in claim 9 which includes:

combining the mechanical energy produced by the drive engine with the mechanical energy produced by the test engine for transfer to the generator for increased production of electricity to the electrical power system.

11. Apparatus for converting mechanical energy produced during testing of an engine to electricity comprising:

an engine under test, a generator coupled to said engine, means for transferring mechanical energy produced by said engine during testing to said generator for conversion to electricity, means for measuring the electricity produced by the generator to obtain a load for evaluating the power produced by said engine under test, and a power conditioner for connecting said generator to an electrical power system to adjust the electricity produced by said generator during testing of said engine for supply to said electrical power system.

12. Apparatus as set forth in claim 11 which includes:

a starter engine connected to said test engine for starting said test engine.

13. Apparatus as set forth in claim 11 in which:

said generator starts said engine under test.

14. Apparatus as set forth in claim 11 which includes:

a power conditioner connected to said generator for conditioning the electricity produced by said generator to complement the quality and performance of the electrical power produced by said engine under test.

15. Apparatus as set forth in claim 11 which includes:

a drive engine connected to said generator for generating mechanical energy, and said drive engine producing mechanical energy combined with mechanical energy produced by said engine under test for transfer to said generator for production of electricity.

16. Apparatus as set forth in claim 11 which includes:

a power transfer mechanism connected to said engine under test for receiving the mechanical energy produced by said engine under test, said generator coupled to said power transfer mechanism for receiving the mechanical energy produced by said engine under test, said power conditioner connected to receive the electricity produced by said generator, and said engine under test, said generator, said power transfer mechanism, and said power conditioner mounted on a mobile platform and surrounded by an environmentally and acoustically sealed enclosure.

17. Apparatus as set forth in claim 16 in which:

said enclosure is operable to dampen sound vibrations generated from the production of electricity within said enclosure.

18. A method for converting mechanical energy produced during testing of an engine to electricity for power consumption comprising the steps of:

starting an engine under test, generating mechanical energy and exhaust from testing the engine, transferring the mechanical energy generated from testing the engine to a generator, converting the mechanical energy by the generator to electricity, conditioning the electricity produced by the generator for transmission to an electrical system for power consumption, feeding the engine exhaust to a steam boiler for generation of steam, feeding the steam produced by the steam boiler to a steam turbine, generating mechanical energy from the steam fed to the steam turbine, transferring the mechanical energy produced by the steam turbine to a generator, converting the mechanical energy by the generator to electricity, conditioning the electricity produced by the generator for transmission to an electrical power system, and supplying the conditioned electricity generated from testing the engine to the electrical power system.

19. A method as set forth in claim 18 which includes: starting the engine under test by the generator.

20. A method as set forth in claim 18 which includes:

generating mechanical energy from a drive engine, and transmitting the mechanical energy from the drive engine to the generator to produce electricity for consumption and peak shaving during the intervals when the engine under test ceases to produce mechanical energy.

* * * * *